Oct. 2, 1956 W. A. VINSON 2,765,026
SOLDERING DEVICE
Filed Sept. 19, 1952
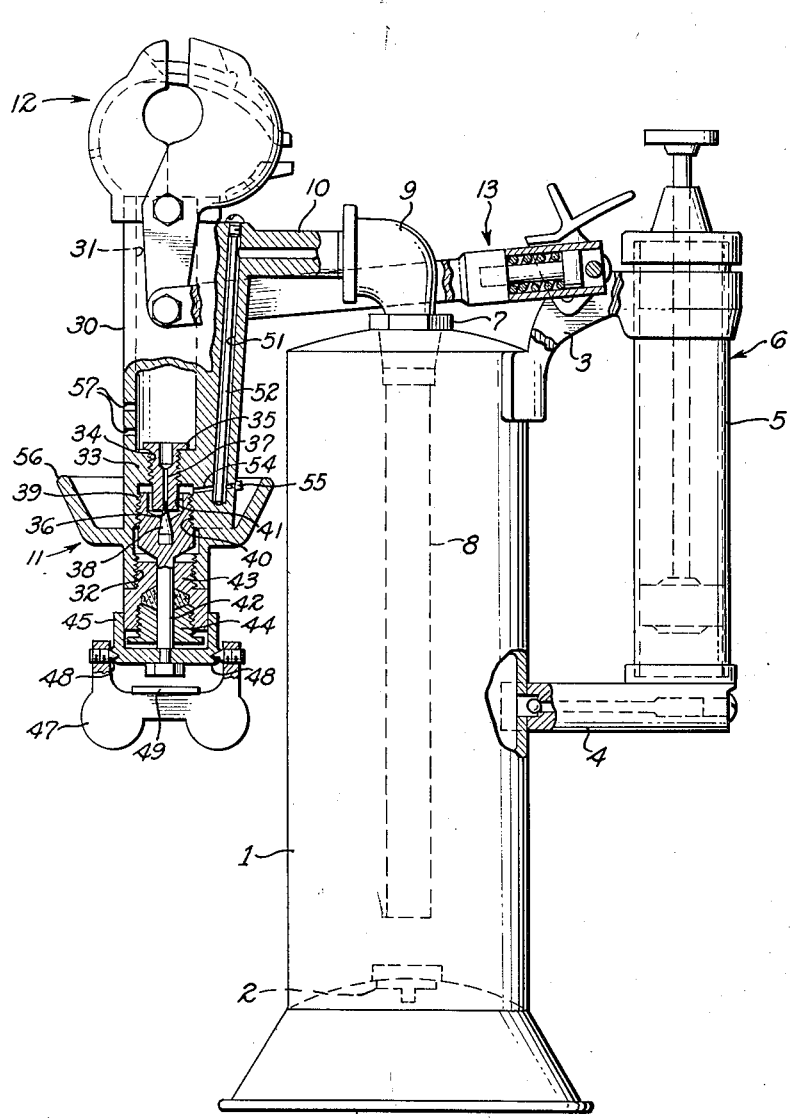
INVENTOR:
WILLIAM A. VINSON
BY HIS ATTORNEYS
HARRIS, KIECH, FOSTER & HARRIS

United States Patent Office 2,765,026
Patented Oct. 2, 1956

2,765,026
SOLDERING DEVICE

William A. Vinson, Madera, Calif.

Original application December 17, 1946, Serial No. 716,798. Divided and this application September 19, 1952, Serial No. 310,391

7 Claims. (Cl. 158—33)

The present invention relates to soldering devices and, more particularly, to a heating or burner unit having particular utility in soldering devices, this application being a division of my copending application Serial No. 716,798, which was filed on December 17, 1946, and which has issued as Patent No. 2,612,856 on October 7, 1952.

In general, the soldering device which incorporates the heating or burner unit of the present invention includes a container or tank adapted to contain a vaporizable fuel under pressure, the tank being provided with a handle which incorporates a pump for pressurizing the fuel in the tank. Carried by the tank is a heating or burner unit of the invention wherein the fuel is vaporized and burned, the resulting products of combustion being delivered to a vise unit in which the work to be soldered is heated.

An important object of the invention is to provide a metering valve for metering the flow of fuel to a combustion chamber in the burner unit, the metering valve being threadedly connected to a burner housing, which forms part of the burner unit, and being adapted to engage a valve seat which is located intermediate the ends of the threaded connection between the metering valve and the burner housing, and which is preferably located midway between the ends of such threaded connection. With this construction, the zone of engagement between the metering valve and the valve seat is located on, or substantially on, the neutral zone of relative thermal expansion between the metering valve and its seat in the burner housing so that any differences in the thermal expansion of the metering valve and the burner housing have no effect, or substantially no effect, on the positional relation between the metering valve and the valve seat. This is an extremely important feature of the present invention since it insures that the setting of the metering valve will not be affected by variations in the temperatures of the burner housing and the metering valve, and also insures that the metering valve will not be jammed against the valve seat, or forced away from it, depending upon the relative coefficients of thermal expansion of the burner housing and the metering valve, as the heating unit cools down after use with the metering valve closed.

Another object of the invention is to provide a heating unit wherein the metering valve is provided with a stem which extends to the exterior of the burner housing and which is provided thereon with a cup or cap telescoped over and rotatable relative to a cylindrical end of the burner housing. With this construction, the stem of the metering valve is protected against bending, or other damage, if the soldering device is accidentally dropped in such a way that a handle connected to the metering valve stem strikes some object in falling.

Another object is to provide the metering valve stem with a handle which is pivotally connected to the cup or cap on the metering valve stem so that it can swing aside if it strikes some object, thereby further minimizing any possibility of damage to the metering valve structure.

Another object is to connect the metering valve handle to the cup or cap by means of pivots which make substantially point contact so as to minimize the transfer of heat from the burner housing to the metering valve handle, thereby substantially eliminating any possibility of burning the fingers of the operator when he grasps the metering valve handle to adjust the flow of fuel to the combustion chamber.

Another object of the invention is to provide a fuel passage to the metering valve which is located in thermally conductive relation to the combustion chamber to produce vaporization of the fuel, which is so constructed as to insure substantially complete fuel vaporization once conditions of operating temperature equilibrium have been attained, and which is so constructed as to prevent flooding of the burner unit with unvaporized fuel. These results are attained by making the fuel passage to the metering valve in the form of an annulus of restricted cross section, the annulus being produced by means of an elongated rod disposed centrally of an elongated bore in the burner housing. Utilizing an annulus of restricted cross section brings the fuel into thermal contact with the burner housing throughout a large area to insure substantially complete vaporization under conditions of operating temperature equilibrium, and prevents excessive cooling of the burner housing in the vicinity of the fuel passage so as to substantially eliminate any tendency to flood the burner unit with unvaporized fuel.

Another object is to provide means for centering the rod in the bore so as to provide the annular fuel passage between the rod and the peripheral wall of the bore.

The foregoing objects and advantages of the present invention, together with other objects and advantages thereof which will become apparent, may be attained with the exemplary embodiment of the invention which is illustrated in the accompanying drawing and which is described in detail hereinafter. The drawing comprises a side elevation of a soldering device which embodies the invention, portions of the device being shown in section to reveal the details thereof.

The soldering device illustrated in the drawing includes a fuel container or tank 1 having threaded into its bottom wall a filler plug 2 which may be removed to permit filling the tank with a suitable vaporizable fuel. Connected to the tank 1 are brackets 3 and 4 which carry a handle 5 for the operator's use in carrying the soldering device. The handle 5 forms the barrel of a pump 6 for pressurizing the tank 1 through a check-valved passage in the bracket 4. Threaded into the upper wall of the tank 1 is a fitting 7 through which extends a depending siphon tube 8, the latter terminating in an open end adjacent the bottom wall of the tank. Communicating with the upper end of the siphon tube is an elbow 9 into which is threaded a tubular stem 10 carrying a heating or burner unit 11 and a vise unit 12. An actuating means 13 for the vise unit 12 is mounted on the handle bracket 3 and is connected to the vise unit. The pump 6, the vise unit 12 and the actuating means 13 of the vise unit 12 per se form no part of the subject matter of this application and, since they are disclosed in detail in my aforesaid copending application, no further reference will be made to these elements herein, reference hereby being made to the aforesaid copending application for any detailed description that may be desired.

The burner unit 11 includes a tubular cylindrical housing 30 having an open upper end and an open lower end 32 and having a partition 33 intermediate the upper and lower ends, the vise unit 12 being mounted on the upper end of the housing 30. A central threaded bore 34 extends through the partition 33 and receives a threaded bushing 35 which extends downwardly to a point below the lower face of the partition. The lower end of this bushing is formed with a central, tapered valve seat 36 which communicates with a fluid passage 37 extending upwardly through the bushing. The bushing 35 is preferably positively secured to the partition 33 so that it will not become loosened, as by silver soldering it in place, for example.

The valve seat 36 is designed to receive a metering valve which is preferably a needle valve 38. The latter is secured to and centrally located in an adjusting cup 39 threaded into a counterbore 40 within the burner housing 30. The zone of engagement between the valve seat 36 and the needle valve 38 is located intermediate the ends of the threaded connection between the adjusting cup 39 and the burner housing 30, and preferably midway between the ends of this threaded connection. The result of this positional relation is that the zone of engagement between the valve and the seat is located in the neutral zone of any differential thermal expansion existing between the needle valve structure and the seat in the burner housing. Thus, variations in the temperature of the structure of the burner unit 11 in operation, or in warming up or cooling off, have no effect on the positional relation between the needle valve 38 and the valve seat 36. Thus, the needle valve setting is not affected by structural temperature variations, nor is there any tendency for the needle valve 38 to be jammed against the valve seat 36, or to be pulled away from it, as the burner unit 11 cools off after use, which are important features of the invention.

The upper end of the adjusting cup 39 is provided with a central recess 41 into which the lower end of the bushing 35 extends, the lower end of the bushing being spaced inwardly of the peripheral wall of the recess 41 to provide a fuel passageway therebetween. Formed in the adjusting cup 39 at the bottom of the recess 41 is a bore into which the base portion of the needle valve 38 is inserted, the needle valve being suitably secured in this bore. The lower end of the cup 39 is provided with a stem 42 which forms part of the needle valve structure and which extends downwardly through a bonnet member 43, the latter being threaded into the open lower end 32 of the burner housing 30. Insertion of the bonnet member 43 into the lower end 32 of the burner housing 30 is limited by an annular shoulder on the bonnet member, this shoulder being adapted to engage the lower end face of the burner housing 30. The lower end of the bonnet member 43 is counterbored and internally threaded and receives a packing gland 44, the stem 42 projecting downwardly below the lower face of the packing gland. Secured to the projecting lower end of the stem 42 is a cap or cup 45 which is telescoped over and is rotatable relative to the cylindrical exterior periphery of the bonnet member 43. The bonnet member 43 makes a relatively close fit with the cup 45 so as to prevent tilting or canting of the cup relative to the bonnet member. With this construction, accidental bending of the stem 42, or other damage to the needle valve structure, is substantially prevented, even if the soldering device is dropped in such a way that the cup 45 lands directly on some object in falling.

A winged handle 47 is secured to the cup 45 by opposed trunnions 48, this pivoted connection of the handle 47 further tending to prevent damage to the needle valve structure if some object strikes the handle. The trunnions 48 are preferably conical, as shown, and fit into complementary sockets in the cup 45. This provides substantially point contacts between the handle 47 and the cup 45 to reduce to a minimum the heat transfer from the burner housing 30 to the handle 47, thereby minimizing the possibility of burning the operator's fingers when he grasps the handle to adjust the needle valve setting. A guard disc 49 is mounted upon the winged handle 47 and prevents contact of the fingers of the operator with the hot lower end of the burner housing 30.

Having considered the needle valve structure and the manner in which it is adjusted, the fuel delivery to the needle valve will now be taken up. Fuel under pressure from the tank 1 passes upwardly through the siphon tube 8 into the tubular stem 10. From the latter, the fuel flows into a passage or bore 51 formed in a rib on the burner housing 30. The bottom of the bore 51 is generally conical, as by being formed with a drill having a tapered point, for a purpose to be described. Extending the length of the bore 51 is a rod or stem 52, this stem having a threaded portion at its upper end which is threaded into the upper end of the bore 51. The threaded connection at the upper end of the stem 52 centers the upper end of the stem in the bore 51, and the lower end of the stem is centered by the tapered lower end of the bore, or the lower end of the stem may be enlarged to fit the bore. The stem 52 thus cooperates with the peripheral wall of the bore 51 to provide an annular fuel passageway having a minimum cross-sectional area. With this construction, the fuel flowing through this annular passageway is spread out into a relatively thin film to insure vaporization by contact with the hot surrounding structure. This construction also reduces any tendency to flood the burner unit with unvaporized fuel since the flow of fuel is retarded because of the fact that vaporization in the annular passageway creates a back pressure against the fuel being fed to the burner from the tank.

The lower end of the bore 51 is intersected by a duct 54 which leads into the upper end of the counterbore 40 in which the adjusting cup 39 is threaded. A removable screw 55 closes the outer end of the duct 54 and permits cleaning of this duct whenever necessary. Disposed around the burner housing 30 in a transverse plane below that of the upper end of the adjusting cup 39 is an annular heating pan 56 within which fuel may be burned preliminarily to heat the burner unit and produce generation of the vaporizable fuel. The side walls of the housing 30 may be formed with suitable air inlet perforations 57 in the zone above the partition 33, this zone being the combustion chamber of the burner unit. The products of combustion formed in this combustion chamber pass upwardly and impinge on the vise unit 12, as fully described in the aforementioned copending application of which this application is a division.

In operation, the tank 1 is filled with liquid fuel to a desired level and the tank is then pressurized by means of the pump 6. Additional liquid fuel is placed in the generating or vaporizing pan 56 and is ignited. The valve stem 42 is then rotated by means of the handle 47 to retract the needle valve 38 from the valve seat 36 so as to admit fuel into the combustion chamber by way of the siphon tube 8, the elbow 9, the tubular stem 10, the annular passageway provided by the bore 51 and the stem 52, the duct 54, the upper end of the bore 40, the annular space between the inner periphery of the adjusting cup 39 and the bushing 35, the annular space between the needle valve 38 and the valve seat 36, and the fluid passage 37. When the burner housing 30 has been heated sufficiently by combustion of fuel in the heating pan 56 to produce proper vaporization of the fuel in the annular passage provided by the bore 51 and the stem 52, combustion may be started in the combustion chamber above the partition 33 and the resulting flame will pass upwardly and impinge on the vise unit 12. The needle valve 38 may be adjusted as desired to provide the required flame intensity. Because of the fact that the zone of engagement between the valve seat 36 and the needle valve 38 is located intermediate the ends of the threaded connection between the cup 39 and the burner housing 30, changing structural temperatures will not affect the setting of the needle valve, which is an important feature of the invention. Moreover, when the needle valve 38 is closed to shut the device off, subsequent cooling of the burner structure will neither jam the needle valve against the seat to damage it, nor will it pull the needle valve away from the seat to permit fuel leakage, which are important features of the invention.

Although I have disclosed an exemplary embodiment of my invention herein for purposes of illustration, it will be understood that various changes, modifications and substitutions may be made in the embodiment disclosed without departing from the spirit of the invention.

I claim as my invention:

1. In a burner structure, the combination of: a housing providing a combustion zone; a valve seat in said housing adjacent said combustion zone; a metering valve adapted to seat on said valve seat; and a support for said metering valve and connected thereto, said support being threadedly connected to said housing so that rotation of said support moves said metering valve toward or away from said valve seat, said valve seat being located intermediate the ends of the threaded connection between said support and said housing.

2. A burner structure as defined in claim 1 wherein said support for said metering valve is threaded into said housing and comprises a cup in which said metering valve is centrally located.

3. In a fuel burner, a tubular housing, a transverse partition intermediate the ends thereof to divide the housing into a combustion section and a fuel intake section, a longitudinal extension projecting from said partition into the fuel intake section, said extension having a fuel passageway lengthwise therethrough and opening from the fuel intake section into the combustion section, a valve seat surrounding the end of the passageway in the fuel intake section, a cup-shaped needle valve support threaded into the fuel intake section for threaded adjustment lengthwise thereof, the cup-shaped support being adapted to receive the extension freely therein, and a needle valve mounted in the cup-shaped valve support and adapted to seat on the valve seat on the extension with the seating area between the needle valve and its seat substantially midway of the length of threaded engagement of the valve support with the housing.

4. In a fuel burner, a combustion chamber, a fuel intake section adjacent thereto and separated therefrom by a partition, an extension on said partition projecting into the fuel intake section, said extension having a fuel passage therethrough opening from the fuel intake section into the combustion chamber, a valve seat formed around said fuel passage in the fuel intake section, a cup-shaped valve support adapted to receive the projecting end of said extension, a valve member adapted to seat on said valve seat, and threaded support for said valve support and adapted to seat the valve member on said seat with the seating area therebetween substantially midway of the length of threaded engagement between said threaded support and said valve support.

5. A burner structure comprising a tubular housing member disposed with its axis vertical, a horizontal partition located intermediate the length of said housing to divide the housing into an upper combustion chamber and a lower fuel inlet chamber, a fuel inlet bushing mounted in an opening in said partition with an axial fuel duct opening through said bushing communicating from the fuel inlet chamber into the combustion chamber, the lower end of the bushing projecting downwardly into the fuel inlet chamber, a valve seat formed on the lower end of said bushing around said duct opening, a threaded cup threadedly mounted within the fuel inlet chamber, into which cup the lower end of the bushing is adapted to extend, pressurized fluid fuel supply means adapted to feed fluid fuel under pressure between the upper edge of the cup and the horizontal partition, a needle valve mounted centrally within said cup and adapted to seat on said valve seat in an area intermediate the length of the threaded mounting of said cup within the fuel inlet chamber, and adjusting means operably secured to said cup and adapted rotatably to adjust the threaded cup and its needle valve to control fuel flow through the bushing.

6. A burner structure according to claim 1 wherein said housing is provided with a cylindrical end, said support having a stem which projects beyond said cylindrical end, and said valve device having a cup carried by said projecting end of said stem and telescoped over said cylindrical end.

7. In a burner structure, the combination of: a housing providing a combustion zone; a valve seat in said housing adjacent said combustion zone and a valve adapted to seat on said valve seat, said valve being threadedly connected to said housing so that rotation of said valve moves said valve toward or away from said valve seat, said valve seat being located intermediate the ends of the threaded connection between said valve and said housing.

References Cited in the file of this patent

UNITED STATES PATENTS

| | | |
|---|---|---|
| 198,411 | Musgrave | Dec. 18, 1877 |
| 625,775 | Kitson | May 30, 1899 |
| 669,476 | Bullard | Mar. 5, 1901 |
| 760,675 | Wolyn | May 24, 1904 |
| 847,723 | Bergmann | Mar. 19, 1907 |
| 913,611 | Beyer | Feb. 23, 1909 |
| 1,056,744 | Lundy | Mar. 18, 1913 |
| 1,141,072 | Mitchell | May 25, 1915 |
| 1,312,135 | Schaffer | Aug. 5, 1919 |
| 1,349,923 | Smith | Aug. 17, 1920 |
| 1,527,269 | Peterson | Feb. 24, 1925 |
| 1,701,716 | Brown | Feb. 12, 1929 |
| 1,711,571 | Martin | May 7, 1929 |
| 1,720,610 | Sanford | July 9, 1929 |
| 1,878,569 | Zolleis | Sept. 20, 1932 |
| 1,921,152 | Caldwell | Aug. 8, 1933 |

FOREIGN PATENTS

| | | |
|---|---|---|
| 122,284 | Australia | Sept. 26, 1946 |
| 641,277 | Great Britain | Aug. 9, 1950 |